WITNESSES
Bernard R. Gegauf
John L. Wiegreffe

INVENTOR
Alvin H. Boerio
BY Ernest P. Klipfel
ATTORNEY 3,161,773

SOLID STATE INFRARED DETECTOR CELL WITH MEANS TO DISCRIMINATE BETWEEN THE SPECTRAL BANDS IN THE INFRARED SPECTRUM

Alvin H. Boerio, Turtle Creek, Pa., assignor to Westinghouse Electric Corporation, East Pittsburgh, Pa., a corporation of Pennsylvania Filed May 18, 1962, Ser. No. 195,755
7 Claims. (Cl. 250—83.3)

This invention relates to photoconductive infrared detectors utilizing a single crystal cell capable of distinguishing between any two spectral regions in the continuous infrared spectrum.

Photoconductive detectors whose infrared response varies as a function of position within the bulk of the crystal are known. This variation can be due to either the manner in which the crystal is illuminated or by impurity-doping the crystal non-uniformly. The impurities provide transitions differing from those of the base material. Both types of these photoconductive transitions give rise to impedance variations which vary the current in biasing circuits through different regions of the crystal. The current variations in these biasing circuits provide electrical signals which are respective time functions of the intrinsic and extrinsic responses to the infrared radiation impinging on the detector.

From Planck's black body radiation law it is known that the total radiated energy increases with the fourth power of the temperature. From Wein's displacement law it is known that the maximum energy density shifts toward shorter wave lengths, that is, increased frequency, with increased temperature. Materials used as infrared detection cells have different absorption coefficients for different frequencies and therefore lend themselves to the production of one or more signals proportional to the energy within one or more spectral bands. Impurity-doped crystal detector cells exhibit two types of photoconductivity; (1) that due to intrinsic transitions, that is, those transitions taking place in the pure crystal lattice structure, and (2) that due to extrinsic transitions which take place in the impurity lattice structure. The latter type is sometimes called impurity photoconductivity.

The coefficient of absorption of materials usually used for infrared detector cells, such as silicon and germanium, is very high for wave lengths shorter than the threshhold for intrinsic photoconduction and therefore substantially all of the intrinsic responses take place in a shallow layer near the surface on which the infrared radiation impinges. However, since the same materials have very low coefficients of absorption for wave lengths longer than the threshold for the intrinsic response, the extrinsic response, that is, that due to the impurity transitions, is distributed substantially uniformly throughout the body of the crystal, assuming the crystal is uniformly doped.

The advantage of using the single impurity-doped crystal as opposed to two physically separate crystals, is that since all of the infrared radiation being detected, is incident upon the single cell, there is no necessity for balancing out differences that might occur between individual cells which might be used to similarly respond to different spectral bands. On the other hand, one of the main problems in utilizing the single cell detector is that of maintaining the mutual independence of the output signals resulting from the intrinsic and extrinsic transitions in the cell. The present invention is directed particularly to an improved arrangement for overcoming this disadvantage.

Accordingly, the general object of the present invention is to provide a novel and improved infrared detector which is also capable of distinguishing between the energy contained in two or more spectral bands with such facility as to give an indication of the temperature of the source of infrared radiation.

The novel features that are considered characteristic of this invention are set forth with particularity in the appended claims. The invention itself, however, both as to its organization and method of operation, as well as additional objects and advantages will be understood from the following description, when read in connection with the accompanying drawing, in which:

Figure 1:
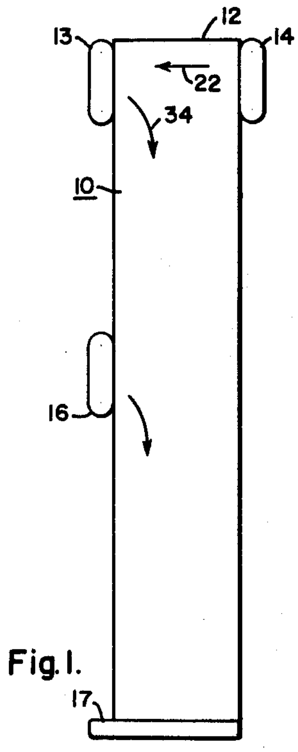
FIG. 1 is a side elevation of an infrared detector cell in accordance with the present invention.

In patent application Serial No. 742,463, filed June 10, 1958, in the name of Max Garbuny and Thomas P. Vogel, now Patent No. 3,061,726, issued October 30, 1962, which is owned by the assignee of the present application, there is described and claimed a single cell detector for detecting continuous infrared radiation and for distinguishing between the spectral bands in the spectrum. The present invention constitutes an improvement over the system shown in the above-mentioned application.

Although the basic principles on which the present invention operates are generally known, it is believed appropriate to review some of the more fundamental principles so that the invention will be more readily and clearly understood.

At low temperatures a semiconductor behaves like an insulator, that is, there are essentially no electrons in the conduction band and no holes in the valence band. Conductivity is increased when an electron is given enough energy to raise it to the conduction band or to an impurity level in the forbidden gap. Such transitions may be caused by the absorption of electromagnetic energy or by thermal energy of the crystal lattice. In order to achieve more sensitive detection of infrared radiation it is necessary to maintain the detection at low temperatures.

Photoconductive devices operate on the principle that when electromagnetic radiation, such as that in the infrared spectrum, impinges on the photoconductive material, electrical carriers will be generated in the material, that is, electrical carriers, commonly referred to merely as carriers in this art, will be excited to states in which they are free to move in an electrical field, thereby increasing the electrical conductivity of the material. Certain materials, such as germanium and silicon, are excellent photoconductors. When these materials are doped with appropriate impurities, such as gold, copper, zinc, platinum and manganese, carriers will be produced to cause two types of electrical conductivity. One is known as intrinsic photoconductivity and the other is known as extrinsic photoconductivity, or impurity photoconductivity. Intrinsic photoconductivity is associated with the pure crystal lattice structure and in order for the intrinsic photoconductivity to take place, it is necessary that the radiation that impinges on the material have sufficient energy to raise an electron in the pure crystal lattice structure from the valence band to the conduction band. Extrinsic photoconductivity is associated with the impurity lattice structure and in order for impurity photoconductivity to be present, the impinging radiation must have an energy level sufficient to raise an electron from an impurity level somewhere within the forbidden gap to the conduction band or raise an electron from the valence band to an impurity level of the acceptor type, leaving a "hole" in the valence band free to move by "hole conduction." The above-mentioned semiconductor materials, when doped with the impurities mentioned above, provide such impurity levels within the forbidden gap. Since these impurity levels are within the forbidden gap, the energy required to raise an electron from an impurity level to the conduction band or from the valence band to an impurity level of the acceptor type is not as great as the energy required to raise an electron from the valence band to the conduction band. Since energy is inversely proportional to the wave length, wave lengths longer than the threshold for intrinsic photoconduction, which is approximately two microns for germanium, will produce impurity photoconductivity but will not produce intrinsic photoconductivity since they may not have sufficient energy to raise electrons from the valence band to the conduction band.

As previously mentioned, the transitions associated with conductivity will take place as a result of thermal energy as well as light energy and therefore it is necessary that the semiconductor material be maintained at a very low temperature in order to insure that the change in conductivity of the material is due to carriers produced by electromagnetic radiation and not thermal noise.

Since the coefficient of absorption in semiconductor material, such as silicon and germanium, is very high for wave lengths shorter than the threshold for intrinsic photoconductivity, all of the photoconductivity due to the intrinsic properties of the material is confined to a shallow layer near the surface of the material on which the infrared radiation impinges. However, these same materials have a very low coefficient of absorption for wave lengths longer than the threshold for the intrinsic photoconduction and therefore the impurity photoconductivity, in other words, the extrinsic response, occurs throughout the body of the semiconductor material in the case of a uniformly doped crystal.

In accordance with the present invention, a semiconductive material such as germanium, impurity-doped with gold, is used for both detecting an infrared source and also for providing signals which are proportional to the energy in different spectral bands. Such material is especially effective in differentiating between radiation having a wave length shorter than two microns and that longer than two microns. Two microns is the approximate threshold value for intrinsic photoconductivity in germanium. A source of infrared radiation whose peak energy density occurs at wave lengths shorter than two microns indicates that the radiating source is relatively hot. By comparing the energy in this spectral band with a spectral band above two microns, the temperature of the source can be determined, which in many cases, can be used as a valuable identification means.

Figure 2:
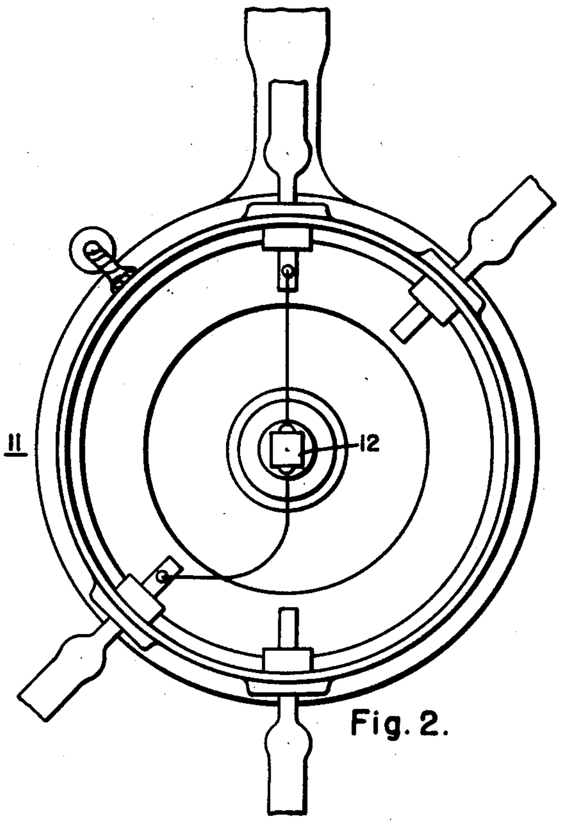
FIG. 2 is a front elevation of the mounting assembly for supporting the detector cell shown in FIG. 1.

In the embodiment of the invention chosen for the purpose of illustration, an impurity-doped semiconductor bar 10, constituting the infrared detection cell, is appropriately mounted in an assembly such as that shown in FIG. 2 where it can be maintained at a very low temperature. The details of the mounting and the means for maintaining the low temperature is not illustrated as it does not form a part of the present invention and is well known in the art. Also, not shown, but it is well understood in the art that means must be provided for sealing the detector cell 10 in an evacuated envelope.

It will be recalled that it was previously mentioned that the intrinsic photoconductivity is substantially limited to a very thin layer or zone adjacent the surface upon which the infrared radiation impinges. In the device illustrated in the drawing, the infrared radiation is adapted to impinge upon the end surface 12. As clearly illustrated in FIG. 2, this surface is square in cross section as is the cross section throughout the length of the detector cell 10. Suitable ohmic contacts 13 and 14 are soldered to the sides of the cell 10, adjacent the end surface 12, and overlays a thin zone in which the intrinsic transitions, due to the impingement of infrared radiation on the surface 12, takes place.

When a continuous infrared spectrum impinges upon the surface 12, the portion of the spectrum which is not absorbed in the thin layer of the material adjacent the surface 12, producing intrinsic transitions, will proceed through the body of the cell 10 lengthwise, thereof, setting up the extrinsic transitions which give rise to the modulations in the extrinsic photoconductivity. Additional electrodes, such as an ohmic contact 16 soldered to one side of the detector cell 10 intermediate the ends thereof, and the base terminal 17 are provided for sensing the extrinsic transitions and are utilized in conjunction with the upper contact terminals 13 and 14 in a novel manner for providing and separating signals appearing at terminals 23, representing the intrinsic response, from signals, representing the extrinsic response, which are measured across the terminals 16 and 17. Extrinsic responses may be referred to as response A while response B represents extrinsic responses. As will be apparent from the subsequent description, in accordance with the invention, the separation of the signals is brought about by a circuit configuration which includes portions of the detector cell 10 as components so that the signal separation takes place within the detector cell 10.

Figure 3:
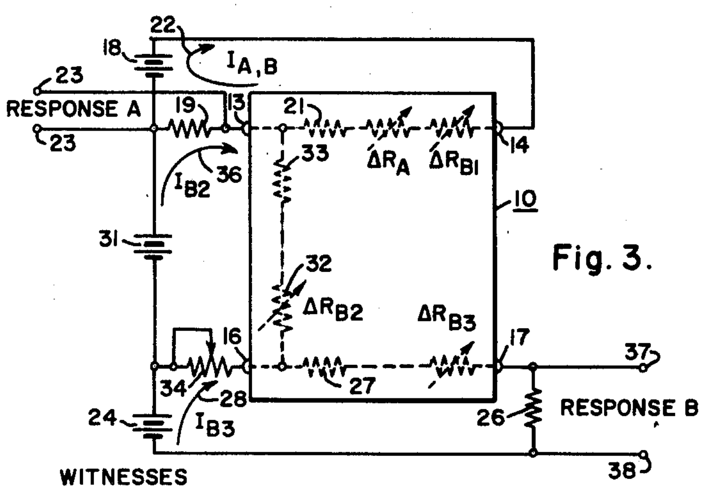
FIG. 3 is a circuit diagram including the equivalent circuit components in the detector cell of the present invention.

Referring to circuit diagram of FIG. 3, it will be noted that a suitable direct current voltage source such as the battery 18 is connected in a biasing circuit which includes terminals 13 and 14 and a load resistor 19.

Components $\Delta R_A$ and $\Delta R_{B1}$ represent photoconductive modulations of the impedance between the contacts 13 and 14, due to the intrinsic and extrinsic transitions, respectively. The impedance, indicated by the numeral 21, represents the constant component of internal impedance between the ohmic contacts 13 and 14. It is clear from FIG. 3 that the polarity is such that the bias currents flow from the ohmic contact 14 to the ohmic contact 13 internally of the detector cell 10 and externally in the circuit as indicated by the direction of the arrow 22. A voltage drop proportional to the current flowing between the ohmic contacts 13 and 14 will appear across the load 19 and will appear at the output terminals 23. It will be apparent from the circuit diagram in FIG. 3 that the output voltage appearing at the terminals 23 will vary in accordance with the photoconductivity produced by infrared radiation energy impinging upon the surface 12. It is necessary to chop the infrared radiation by any suitable light chopper, such as that shown and described in the aforementioned application. This permits the detection of small changes in conductivity in the presence of relatively large bias currents. From the preceding discussion, it will be apparent that the dominant modulation of the photoconductivity will be represented by the impedance drop across $\Delta R_A$, that is, that which results from the intrinsic transitions in the detector cell 10.

As the description proceeds, it will be understood how the analogue signals appearing across the terminals 23 represent the response due only to the intrinsic transitions and will not include a component resulting from extrinsic transitions appearing throughout the body of the detector cell 10. The infrared radiation which impinges upon the surface 12, and which is not absorbed in the thin layer adjacent the surface 12, will continue to travel throughout the length of the cell 10 and will give rise to extrinsic transitions which can be measured electronically in a biasing circuit including a source of voltage connected between the ohmic contact 16 and the base terminal 17. To this end, a second source of direct current voltage, such as a battery 24, is connected in a circuit including a second load resistor 26 in series with the terminals 16 and 17. Although the intrinsic response is substantially confined to the thin layer between the ohmic contacts 13 and 14, the extrinsic transition response is distributed uniformly throughout the crystal. Thus, between any two contacts on the cell 10, an extrinsic response will be measured. The circuit diagram of FIG. 3, accounts for the fact that $\Delta R_{B1}$, $\Delta R_{B2}$, and $\Delta R_{B3}$, representing the extrinsic components. In the example given, $\Delta R_{B3}$ is used to provide the output signal of the extrinsic response and is due to the photoconductivity occurring in the detector cell 10 between the ohmic contact 16 and the base electrode 17. This signal will be the voltage drop across the impedance $\Delta R_{B3}$. The impedance component indicated at 27 represents the constant internal impedance between the ohmic contact 16 and the base terminal 17. The value of the impedance 27 would be substantially the same as the value of the component 21.

In order to eliminate from the output circuit between the terminals 23 the signal component $\Delta R_{B1}$, due to the inherent extrinsic response affecting the bias circuit between contacts 13 and 14, a third source of potential in the form of a battery 31 is connected in a series circuit including the load resistor 19, the ohmic contact 13 and the ohmic contact 16. The variable impedance due to the extrinsic photoconductivity between terminals 13 and 16, is represented by the impedance indicated at 32, while the constant component of the impedance between ohmic contacts 13 and 16, is represented by the impedance 33. The polarity of the battery 31 is such as to provide a current through the load resistor 19 and the cell 10 from the ohmic contact 13 to the ohmic contact 16 as indicated by the arrow 34 in opposition to the direction of current indicated by the arrow 22, produced by the battery 18, through the resistor 19. By adjusting the relative values of bias currents produced by the batteries 18 and 31, such as by means of an adjustable rheostat 34, the opposing currents indicated by the arrows 22 and 36 can be adjusted so that the extrinsic response component represented by $\Delta R_{B2}$ cancels the extrinsic response signals represented by $\Delta R_{B1}$ between the termminals 13 and 14. Accordingly, the signal appearing at the terminal 23 represents an analogue of the intrinsic photoconductivity entirely independent of the extrinsic response. It will be understood, of course, that the analogue signals representing the extrinsic response will appear across the load resistor 26 and may be sensed at the output terminals 37 and 38.

Figures 4, 7:
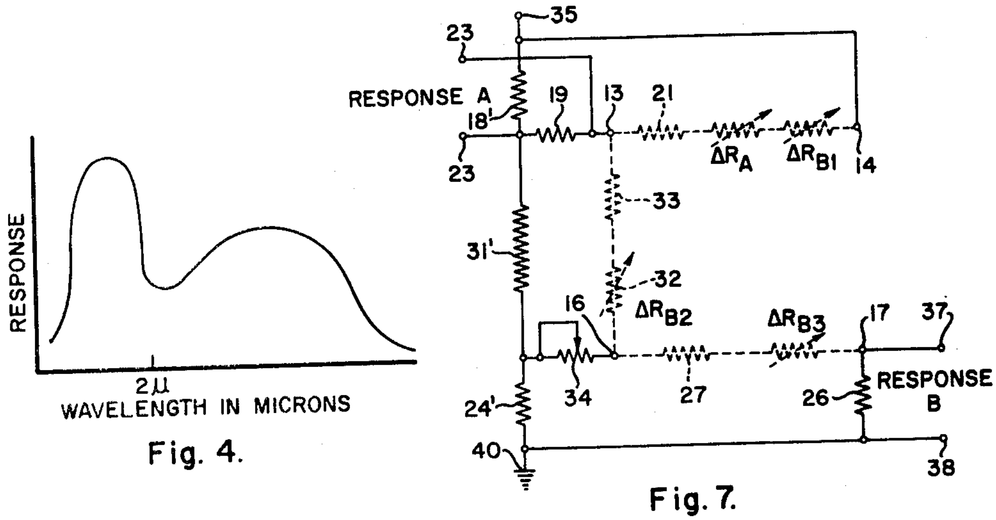
FIG. 4 is a graph of the transition response as a function of the wave length of the incident continuous infrared radiation.
FIG. 7 is a circuit diagram of a second embodiment utilizing a single source of biasing potential and a potential divider for providing the desired bias potentials.

It will be readily apparent to one skilled in the art, that a single direct current or alternating current source in combination with a suitable potential divider could be substituted for the three batteries shown. To this end, the circuit diagram of FIG. 7 illustrates the manner in which any single source of biasing potential, not shown, which would be connected across a potential divider constituted by the resistors 18', 31' and 24' connected between terminal 35 and ground 40. The potential drops across the respective resistors 18', 31' and 24' in FIG. 7 correspond, respectively, to the potentials of batteries 18, 31 and 24 of FIG. 3. The circuit diagram of FIG. 7 is identical with that of FIG. 3 except that the aforementioned substitutions have been made. Since the batteries 18, 31 and 24 of FIG. 3 are connected in series between terminal 14, which is at the same potential as that of the positive terminal of the battery 18, which terminal corresponds to the terminal 35 of FIG. 7 and the terminal 38, which corresponds to the ground 40 of FIG. 7, it is readily apparent that the three batteries are the electrical equivalent of a single source of potential which can be used to energize a potential divider to provide the desired biasing potentials which are also poled in the same relative directions as the separate batteries. The resistances 18', 31' and 24' constitute the potential divider in this instance.

Figures 5, 6:
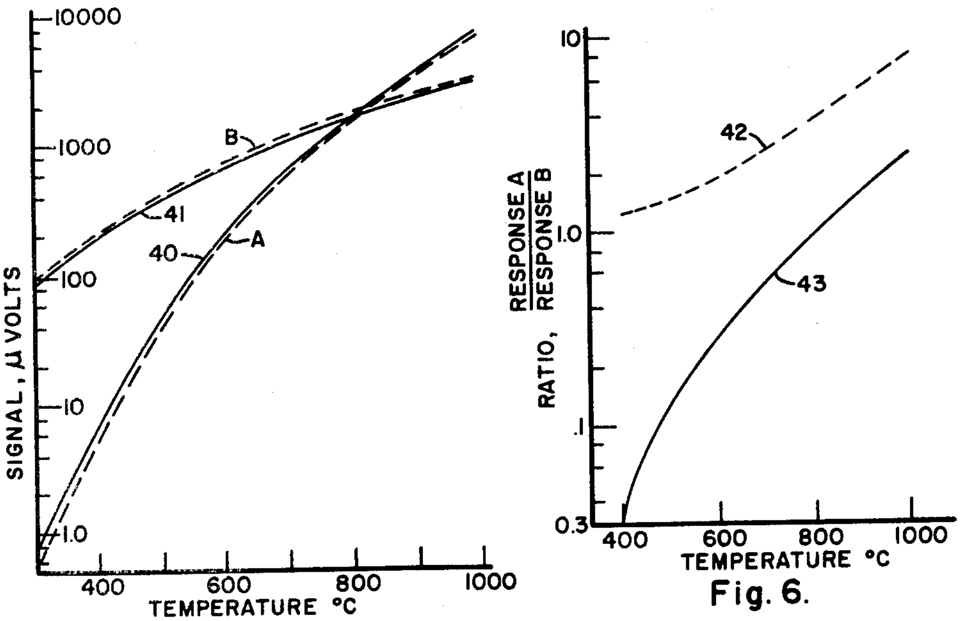
FIG. 5 is a graph showing the signal as a function of the temperature of the infrared radiation.
FIG. 6 is a graph representing the ratio of the intrinsic response to the extrinsic response as a function of temperature.

The graph in FIG. 4 may arbitrarily represent the analogue signals appearing across the terminals 23, representing the intrinsic response to wave lengths shorter than two microns. The extrinsic response, which would be represented by analogue signals appearing across the terminals 37 and 38, is represented by the "hill" at the right-hand side of the figure. Referring to FIG. 5, the signal separation is represented by the curve 40, which represents the intrinsic response, while curve 41 represents the extrinsic response. The dotted lines, associated with each of the respective curves, represent the response as measured by accurate laboratory apparatus using filters. This is a clear indication that the present invention is capable of highly accurate spectral discrimination.

FIG. 6 represents the efficiency of the present invention in another manner. The dotted curve 42 represents the ratio of the intrinsic response A to the extrinsic response B measured electronically without the circuit configuration of the present invention. The solid curve 43 represents the ratio of the intrinsic response A to the extrinsic response B when measured by the system provided by the present invention which cancels the extrinsic contribution to the signal at terminals 23, representing the intrinsic response. The curves of this figure demonstrate that the invention affords a much more accurate determination of temperature, without the need for additional electronic equipment, external to the detector, which might perform the same function.

I claim as my invention:

1. An infrared detector comprising an impurity doped semiconductor member adapted to have impinged thereon a continuous infrared spectrum, said semiconductor member having an intrinsic transition response to a first spectral band of said infrared spectrum and an impurity transition response to another spectral band of such radiation, a first pair of terminals and a second pair of terminals connected to said semiconductor member, one of said pairs of terminals being positioned adjacent a region of said semiconductor member having a transition responsive due predominantly to intrinsic photoconductivity, said second pair of terminals connected to said member between points on said member between which transition responses due predominantly to impurity photoconductivity takes place, said first and second pair of leads having one lead in common, a source of voltage connected in a series circuit including said first pair of terminals and a load resistor, a second source of voltage in a series circuit including said second pair of terminals and said load resistor, instantaneous polarities of said voltage sources being such as to cause opposing voltage drops in said load resistor.

2. An infrared detector comprising an impurity doped semiconductor member adapted to have impinged thereon a continuous infrared spectral, said semiconductor member having an intrinsic transition response to a first spectral band of said infrared spectrum and an impurity transition response to another spectral band of such radiation, a first pair of terminals and a second pair of terminals connected to said semiconductor member, one of said terminals being an infrared detector including an elongated impurity-doped semiconductor member having an end face surface adapted to have infrared radiation impinged thereon, said member having a length substantially greater than either dimension of said end face, a pair of terminals connected to opposite sides of said member immediate adjacent said end face, a third terminal connected to one side of said member intermediate the ends thereof, a fourth terminal connected to the other extremity of said member, a source of voltage connected in a series circuit including said first pair of terminals and a load resistor, a second source of voltage connected in series circuit including said load resistor and one of said first pair of terminals, the instantaneous polarity of said voltage sources being such as to cause opposing voltage drops in said load resistor.

3. An infrared detector including an elongated impurity doped semiconductor member having an end face surface adapted to have infrared radiation impinged thereon, said member having a length substantially greater than either dimension of said end face, a pair of terminals connected to opposite sides immediately adjacent said end face, a third terminal connected to one side of said member intermediate the ends thereof, a fourth terminal connected to the other extremity of said member, a source of voltage connected in series circuit including said first pair of terminals and a load resistor, a a second source of voltage connected in a series circuit including said third and fourth terminals and said load resistor, the instantaneous polarity of said voltage sources being such as to cause opposing voltage drops in said load resistor, a third source of voltage connected in a series circuit including said third and fourth terminals and a second load resistor.

4. An infrared detector comprising a semiconductor element having an end face adapted to have infrared radiation incident thereupon, a pair of terminals connected to opposite sides of said element immediately adjacent said end face, a third terminal on one side of said element spaced longitudinally of said element with respect to said pair of terminals, a circuit including said pair of terminals, a load resistor and biasing means, a second circuit including one of said pair of terminals, said third terminal and said load resistor and biasing means, said biasing means being so poled as to cause current flowing between said pair of terminals in response to absorbed infrared radiation in one portion of the spectral band to oppose currents flowing in said second circuit due to absorbed infrared radiation in another portion of the spectral band.

5. An infrared radiation detector comprising an impurity doped semiconductor member having an end face upon which a continuous infrared spectrum is adapted to be impinged and to pass through a substantial portion of said member to give intrinsic and extrinsic responses, said semiconductor member having a high coefficient of absorption and intrinsic response for radiation in a lower portion of the spectral band and substantially lower coefficient of absorption and extrinsic response to another spectral band, a common load resistive impedance, a pair of terminals on opposite sides of said member immediately adjacent said end face between which intrinsic response to the portion of the spectral band for which said member has high coefficient of absorption takes place, a third terminal on one side of said member and spaced longitudinally from said end face and between which third terminal and one of said pair of terminals substantially only extrinsic response to the other spectral band takes place, a first circuit including said pair of terminals, said common load impedance and biasing means, a second circuit including one of said pair of terminals, said common load impedance and biasing means, said biasing means being so poled relative to each other so that the respective potential drops in said common load impedance in response to intrinsic transitions in said first circuit and extrinsic transitions in said second circuit oppose each other.

6. An infrared detector comprising an impurity doped semiconductor member adapted to have impinged thereon a continuous infrared spectrum, said semiconductor member having an intrinsic transition response to a first spectral band of said infrared spectrum and an impurity transition response to another spectral band of such radiation, a first pair of terminals and a second pair of terminals connected to said semiconductor member, one of said pairs of terminals being positioned adjacent a region of said semiconductor member having a transition response due predominantly to intrinsic photoconductivity, said second pair of terminals connected to said member between points on said member between which transition responses due predominantly to impurity photoconductivity takes place, said first and second pairs of leads having one lead in common, voltage biasing means applied across a series circuit including said first pair of terminals and a load resistor, voltage biasing means connected across a series circuit including said second pair of terminals and said resistor whereby opposing potential drops representing, respectively, the potential drops between the respective pairs of terminals are developed across said load resistor.

7. An infrared detector including an elongated impurity doped semiconductor member having an end face surface adapted to have infrared radiation impinged thereon, said member having a length substantially greater than either dimension of said end face, a pair of terminals connected to opposite sides of said member immediately adjacent said end face, a third terminal connected to one side of said member intermediate the ends thereof, a fourth terminal connected to the other extremity of said member, voltage biasing means connected in a series circuit including said first pair of terminals and a load resistor, voltage biasing means connected across a series circuit including said third and fourth terminals and said load resistor, the instantaneous polarity of said biasing means being such as to cause opposing voltage drops in said load resistor.

References Cited in the file of this patent

UNITED STATES PATENTS

| | | |
|---|---|---|
| 2,629,802 | Pantchechninoff | Feb. 24, 1953 |
| 2,644,852 | Dunlap | July 7, 1953 |
| 3,061,726 | Garbuny | Oct. 30, 1962 |